United States Patent
Bär et al.

(10) Patent No.: US 11,922,256 B2
(45) Date of Patent: Mar. 5, 2024

(54) INDUSTRIAL DEVICE AND METHOD OF READING A TAG LOCATED ON AN OBJECT USING A MODEL

(71) Applicant: Siemens Aktiengesellschaft, Munich (DE)

(72) Inventors: Felix Bär, Fürth (DE); Ralf Gross, Nuremberg (DE); Vladimir Lavrik, Hessen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/927,718

(22) PCT Filed: Mar. 22, 2021

(86) PCT No.: PCT/EP2021/057197
§ 371 (c)(1),
(2) Date: Nov. 24, 2022

(87) PCT Pub. No.: WO2021/239287
PCT Pub. Date: Dec. 2, 2021

(65) Prior Publication Data
US 2023/0214609 A1   Jul. 6, 2023

(30) Foreign Application Priority Data
May 27, 2020   (EP) .................................. 20176802

(51) Int. Cl.
*G06K 7/10*   (2006.01)
(52) U.S. Cl.
CPC ............................. *G06K 7/10366* (2013.01)

(58) Field of Classification Search
CPC ..... G06K 7/10366; G06K 7/10; G06K 7/1482
See application file for complete search history.

(56) References Cited

U.S. PATENT DOCUMENTS

| | | | | |
|---|---|---|---|---|
| 2007/0265866 A1* | 11/2007 | Fehling | .................. | G06Q 10/08 340/506 |
| 2008/0136586 A1* | 6/2008 | Backes | ................ | G06Q 10/087 340/5.8 |

(Continued)

FOREIGN PATENT DOCUMENTS

EP    2806378    11/2014

OTHER PUBLICATIONS

PCT International Search Report dated Jun. 20, 2022 based on PCT/EP2021/057197 filed Mar. 22, 2021.

*Primary Examiner* — Tuyen K Vo
(74) *Attorney, Agent, or Firm* — Cozen O'Connor

(57) ABSTRACT

A method of reading a tag located on an object, wherein the tag includes tag values associated with the object, where the method includes obtaining a first sensor output, by reading the tag using a tag reader, the first sensor output being at least one of an erroneous and incomplete representation of the tag values of the tag and includes deriving at least one tag value from the first sensor output using a model, where the model is based on a first set of sensor outputs generated by the tag reader by reading a plurality of tags and tag values associated with the plurality of tags, and where the first set of sensor outputs includes a plurality of sensor outputs, where each sensor output includes at least one of an erroneous and incomplete representation of at least one tag value of the corresponding tag.

9 Claims, 5 Drawing Sheets

(56) References Cited

U.S. PATENT DOCUMENTS

| | | | |
|---|---|---|---|
| 2010/0085190 A1* | 4/2010 | Sueoka | H04Q 9/00 340/10.3 |
| 2012/0013445 A1* | 1/2012 | Yasuda | G06Q 50/28 340/10.1 |
| 2019/0019086 A1 | 1/2019 | Schueler | |
| 2020/0313781 A1* | 10/2020 | Parshin | G06K 7/10099 |

* cited by examiner

INDUSTRIAL DEVICE AND METHOD OF READING A TAG LOCATED ON AN OBJECT USING A MODEL

CROSS-REFERENCE TO RELATED APPLICATIONS

This is a U.S. national stage of application No. PCT/EP2021/057197 filed 22 Mar. 2021. Priority is claimed on European Application No. 20176802.5 filed 27 May 2020, the content of which is incorporated herein by reference in its entirety.

BACKGROUND OF THE INVENTION

1. Field of the Invention

The present invention relates to machine readable tags and labels used for identification of objects and more particularly to labels and tags used in industrial environments, where readable labels and tags are used in a plurality of applications, such as industrial automation, logistics, baggage handling and/or warehouse management, for tracking and managing a plurality of assets in these applications. Examples of machine-readable tags includes printed tags such as barcodes and/or QR codes, and wireless tags such as RFID tags and/or Bluetooth tags.

2. Description of the Related Art

The current disclosure relates to machine readable labels and tags used for tracking and handling various objects in industrial or retail environments. In these environments, information from the machine-readable tags is often used to take a plurality of actions and accordingly, information read from the tags must be trustworthy to base decisions on the acquired information. Accordingly, to ensure that the information from the tags are trustworthy or accurate, a plurality of physical constraints must be observed to ensure that the sensor output from tag readers are accurate. Examples of such physical constraints include suitable proximity between tag and tag reader, an unobstructed view and clean lenses for camera systems for reading printed labels, interference free spectrum for radio frequency identification (RFID) readers for reading RFID tags, and/or relative velocity between the tag and the tag reader. Often, these constraints require modifications in the production process.

For example, reading out an RFID tag imposes an upper bound on the relative tag velocity, depending on the sensor size and field intensity. For camera systems a similar limitation is given, as deducing information from barcodes requires an image without blurring. Therefore, the tag (and, thereby, also the product or product part it is attached to) needs to be decelerated at the position of the tag reader, often up to a total stop of the movement, and accelerated after the information has been read out by the tag reader. This results in an extended process time as well as an increased energy consumption (due to deacceleration and acceleration of the corresponding product). Furthermore, the deacceleration and acceleration of the product, imposes mechanical stress on the product and the handling/transportation system, possibly reducing the quality of the product and/or the durability of the transportation/handling system. In many cases, an additional mechanical component, e.g., a pneumatic stopper, is necessary to enable the deceleration without affecting the transportation of other products. Accordingly, there is a need for a method and system that addresses the issues mentioned above.

SUMMARY OF THE INVENTION

Accordingly, it is an object of the invention to provide an industrial device, non-transitory storage mediums and methods for reading a tag located on an object.

This and other objects are achieved in accordance with the invention by a method of reading a tag located on an object. The tag comprises one or more tag values associated with the object. The method comprises obtaining a first sensor output, by reading the tag using a tag reader, where the first sensor output is at least one of an erroneous and incomplete representation of the one or more tag values of the tag. The method also comprises deriving one or more tag values from the first sensor output using a model. The model is based on a first set of sensor outputs generated by the tag reader by reading a plurality of tags and tag values associated with the plurality of tags, where the first set of sensor outputs comprises a plurality of sensor outputs, where each sensor output comprises at least one of an erroneous and incomplete representation of one or more tags values of the corresponding tag.

Accordingly, the above described method improves the reliability of tag readers without modifications to the production process. Despite the sensor outputs being erroneous, the correct tag values can be determined using the model. Accordingly, this improves the overall efficiency of the industrial automation systems.

In an example, the object is moving with a first velocity from a first position to a second position and where the tag reader is affixed at a third position between the first and second positions. The sensor output generated by the tag reader is erroneous or incomplete due to the first velocity of the object causing the tag reader to read the tag incorrectly.

In an example, the model is trained using a training data set comprising a first set of sensor outputs generated by the tag reader by reading a plurality of tags and a second set of sensor outputs from a second tag reader by reading the plurality of tags, where each sensor output from the second set of sensor outputs is generated by the second tag reader by reading a corresponding tag from the plurality of tags and is a complete representation of one or more tag values of the corresponding tag. Accordingly, by using the second set of sensor outputs, the accuracy of the model is further improved.

In an example, the second tag reader is affixed at a sixth position between fourth and fifth positions, where the object with a tag is moving with a second velocity from the fourth position to the fifth position, and where the second velocity is less than the first velocity. Accordingly, this ensures that the sensor output from the second tag reader is complete and accurate representation of the tag values of the tag on the object.

It is also an object of the invention to provide a method of training a model. Here, the method comprises receiving a first set of sensor data from a first tag reader, where the first set of sensor data comprises a plurality of sensor outputs generated by the first tag reader by reading a plurality of tags, each tag of the plurality of tags is located on a corresponding object moving at a first velocity, and where each sensor output from the first set of sensor data is at least one of an erroneous and incomplete representation of one or more tag values of a corresponding tag. The method also includes receiving a second set of sensor data from a second tag reader, where the second set of sensor data comprises a plurality of sensor outputs generated by the second tag reader by reading the plurality of tags, where each tag from on the plurality of tags being located on a corresponding object moving at a second velocity, and where each sensor output from the second set of sensor data is a complete representation of one or more tag values of a corresponding tag. The method further includes training the model by mapping the first set of sensor data with the second set of sensor data, where each sensor output from the first set of sensor data of a corresponding tag is mapped to a sensor output from the second set of sensor data of the corresponding tag based on a tag identifier of the corresponding tag. Accordingly, by using the second set of sensor outputs to train the model, the accuracy of the model is further improved.

It is also an object of the invention to provide an industrial device for determining one or more tag values of a tag located on an object. The industrial device comprises a network interface connected to a tag reader, and one or more processors configured to receive a first sensor output from the tag reader via the network interface, where the first sensor output is generated by the tag reader by reading the tag located on the object and where the first sensor output is at least one of an erroneous and incomplete representation of the one or more tag values of the tag The one or more processors configured are additionally configured to derive one or more tag values from the first sensor output using a model. The model is based on a first set of sensor outputs generated by the tag reader by reading a plurality of tags, and tag values associated with the plurality of tags, where the first set of sensor outputs comprises a plurality of sensor outputs, and where each sensor output comprises at least one of an erroneous and incomplete representation of one or more tags values of the corresponding tag.

It is also an object of the invention to provide a training system for training a model for determining one or more tag values of a tag. The training system comprises a first tag reader installed between a first and a second position, within a proximity of a transportation system, a second tag reader installed between a third and a fourth position, within a proximity of the transportation system, and an industrial device connected to the first and tag readers. The first tag reader is configured to generate a first set of sensor outputs by reading a plurality of tags, where each tag of the plurality of tags is located on a corresponding object moving at a first velocity on the transportation system, and where each sensor output from the first set of sensor outputs is at least one of an erroneous and incomplete representation of one or more tag values of a corresponding tag. Similarly, the second tag reader is configured to generate a second set of sensor outputs by reading the plurality of tags, where each tag of the plurality of tags is located on a corresponding object moving at a second velocity on the transportation system, and where each sensor output from the second set of sensor outputs is a complete representation of one or more tag values of a corresponding tag. The industrial device is configured to receive the first set of sensor outputs from the first tag reader and the second set of sensor outputs from the second tag reader, and train the model by mapping the first set of sensor data with the second set of sensor data, where each sensor output from the first set of sensor data of a corresponding tag is mapped to a sensor output from the second set of sensor data of the corresponding tag based on a tag identifier of the corresponding tag.

In an example, the industrial device is configured to change a velocity of the object on the transportation system between the first and second position and the fourth and fifth positions.

It is a further object of the invention to provide a non-transitory storage medium for reading a tag located on an object, where the tag comprises one or more tag values associated with the object. The non-transitory storage medium comprises a plurality of instructions, which when executed by one or more processors, cause the one or more processors to obtain a first sensor output, by reading the tag using a tag reader, where the first sensor output is at least one of an erroneous and incomplete representation of the one or more tag values of the tag; and cause the one or more processors to derive one or more tag values from the first sensor output using a model. The model is based on a first set of sensor outputs generated by the tag reader by reading a plurality of tags and tag values associated with the plurality of tags, where the first set of sensor outputs comprises a plurality of sensor outputs, where each sensor output comprises at least one of an erroneous and incomplete representation of one or more tags values of the corresponding tag.

It is a still further object of the invention to provide a non-transitory storage medium for training a model. The non-transitory storage medium comprises a plurality of instructions, which when executed by one or more processors, cause the one or more processors to receive a first set of sensor data from a first tag reader, where the first set of sensor data comprises a plurality of sensor outputs generated by the first tag reader by reading a plurality of tags, where each tag of the plurality of tags is located on a corresponding object moving at a first velocity, and where each sensor output from the first set of sensor data is at least one of an erroneous and incomplete representation of one or more tag values of a corresponding tag; cause the one or more processors to receive a second set of sensor data from a second tag reader, where the second set of sensor data comprises a plurality of sensor outputs generated by the second tag reader by reading the plurality of tags, where each tag of the plurality of tags is located on a corresponding object moving at a second velocity, where each sensor output from the second set of sensor data is a complete representation of one or more tag values of a corresponding tag; and cause the one or more processors to train the model by mapping the first set of sensor data with the second set of sensor data, where each sensor output from the first set of sensor data of a corresponding tag is mapped to a sensor output from the second set of sensor data of the corresponding tag based on a tag identifier of the corresponding tag. The advantages of the methods apply to the devices described herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which.

DETAILED DESCRIPTION OF THE EXEMPLARY EMBODIMENTS

Figure 1:
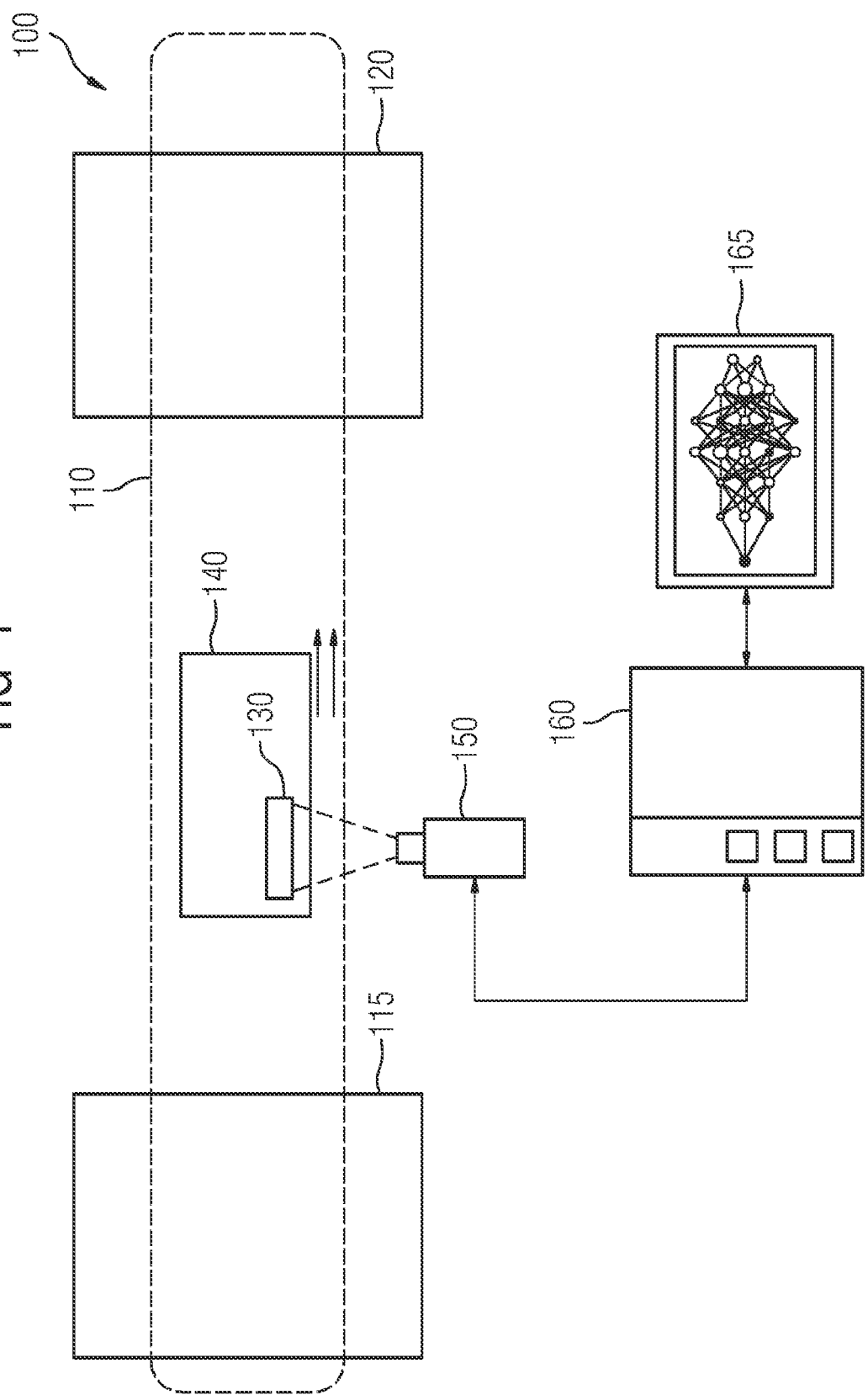
FIG. 1 illustrates a section of an industrial automation system in an industrial facility in accordance with the invention.

FIG. 1 describes a section 100 of an industrial automation system in an industrial facility. Industrial facility herein refers to any environment where one or more industrial processes such as manufacturing, refining, smelting, assembly of equipment may occur and includes process plants, oil refineries, automobile factories, and/or warehouses. The industrial automation system 100 includes a transportations system 110 for transporting a plurality of objects within the industrial facility. The transportation system 110 may include automated guidance vehicles, conveyor belts, cable cars, and/or electric loaders. A plurality of stations is present in the transportation system (shown in the figure as first station 115 and second station 120) where one or more operations may be performed on the objects. For example, the first station 115 may be a welding station 115 at which one or more welding operations are implemented on the objects. Similarly, the second station 120 may be a painting station where one or more painting operations are implemented on the objects from the first station 115.

An exemplary object 140 moving on the transportation system 110 is shown in FIG. 1. The exemplary object 140 is being moved from station 115 to station 120. The exemplary object 140 includes a machine-readable tag 130 installed on the outer surface of the object 140. The tag 130 includes one or more tag values containing information regarding the object 140. The machine-readable tag 130 may be of a printed tag type or a wireless tag type. Examples of printed tag types include barcodes, and/or quick response codes (QR). Examples of wireless tag types include Radio Frequency Identification tags (RFID), Bluetooth tags, and/or Near Field Communication tags (NFC). The tag values stored on the tag are associated with the object 140 and contain information relevant to the processing and transportation of the object 140 within the industrial facility. For example, the one or more tag values include an identifier associated with the object, details of the operations performed on the object 140 along with the timestamps associated with the operations, or details of the operations to be performed on the object 140. For example, based on the tag values the industrial automation system determines the stations to which the object 140 is to be transported using the transportation system 110.

During the transportation from the station 115 to the station 120, the tag 130/object 140 is sensed and read by a tag reader 150. The tag reader 150 is connected to an industrial controller 160 of the industrial automation system. The industrial controller 160 receives the sensor output from the tag reader 150 and determines the tag values of the tag from the sensor output of the tag reader 150. In an example, the industrial controller 160 is capable of operating one or more components of the transportation system 120. For example, the industrial controller 160 is connected to a plurality of actuators for controlling the transportation system 120. The industrial controller 160 is configured to check if the sensor output is an accurate and complete representation of the tag values of the tag 130. If the sensor output is one of erroneous or incomplete representation of the tag values of the tag 130, then the industrial controller 160 can derive the tag values from the sensor output using a model 165, as further explained with respect to FIG. 2.

Figure 2:
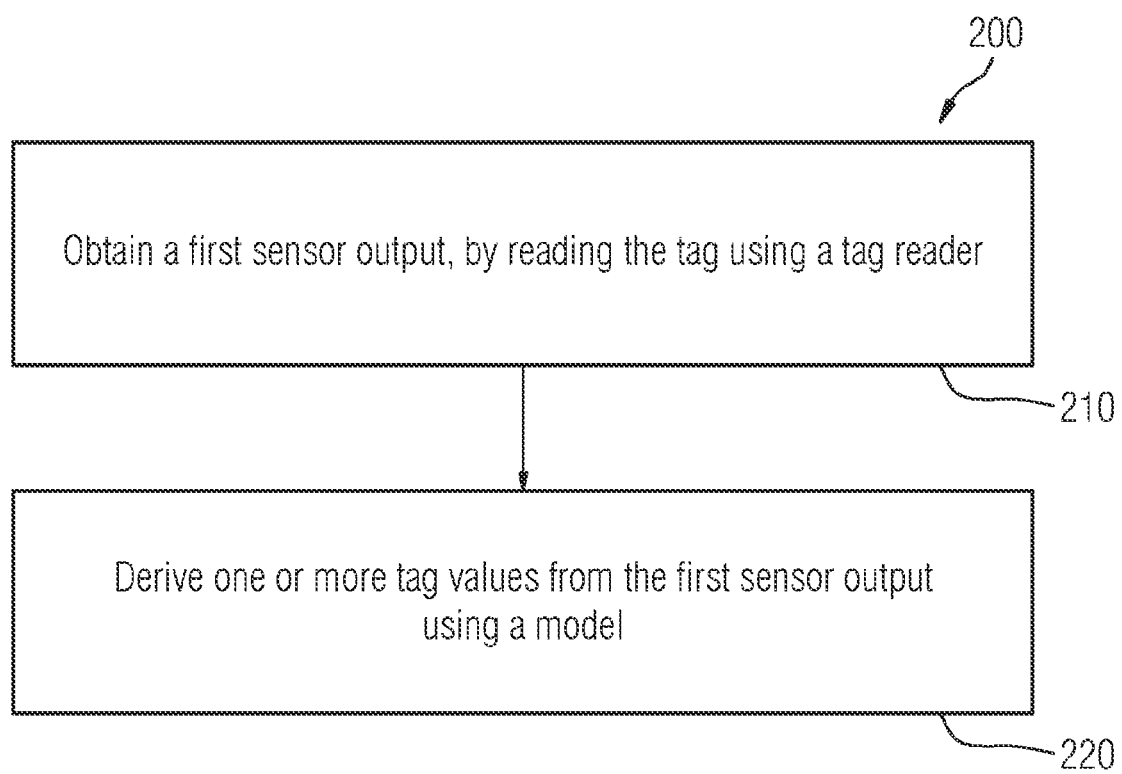
FIG. 2 illustrates an exemplary method for reading a tag located on an object in accordance with the invention.

FIG. 2 illustrates a method 200 of reading the tag 130 located on the object 140. The method 200 is realized by the industrial controller 160. At step 210, the industrial controller 160 obtains a first sensor output from the tag reader 150. The first sensor output is generated by the tag reader by reading the tag using a tag reader. However, due to the physical conditions of the tag reader 150 and the object 140, the tag 130 is not read correctly by the tag reader 150 and accordingly, the first sensor output is at least one of an erroneous and incomplete representation of the one or more tag values of the tag.

In an example, subsequent to obtaining the first sensor output, the industrial controller 160 determines if the first sensor output is one of an erroneous or accurate representation of the tag values of the tag 130. The sensor output is deemed to be erroneous or incomplete when the tag values cannot be retrieved from the sensor output. In order to do so, the industrial controller implements one or more error detection techniques such as checksum, and/or hamming codes. In an example, for printed tags, the industrial controller can use edge detection techniques to see if the sensor output (i.e., the image of the tag) is erroneous or incomplete.

Then at step 220, the industrial controller 160 derives one or more tag values from the first sensor output using the model 165. The model 165 is a model based (i.e., trained or built) on a first set of sensor outputs generated by the tag reader 150 by reading a plurality of tags, and tag values associated with the plurality of tags. The model may be based on any suitable analytical technique including but not limited by neural networks, support vector machines and other well-known machine learning techniques.

Figure 3:
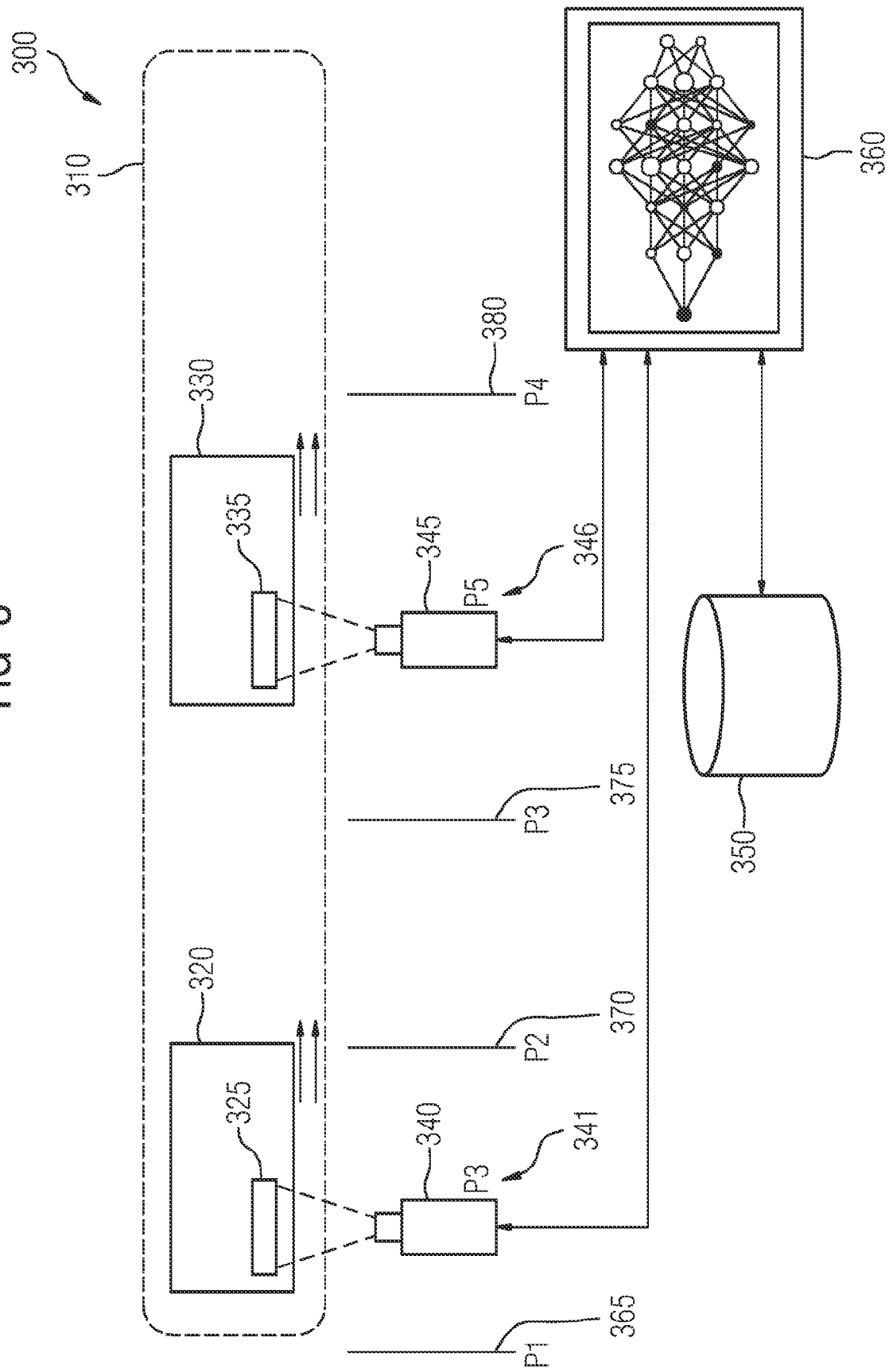
FIG. 3 illustrates a training system for training a model in accordance with the invention.

The first set of sensor outputs comprises a plurality of sensor outputs, where each sensor output comprises at least one of an erroneous and incomplete representation of one or more tags values of the corresponding tag. Accordingly, the model 165 is trained to map erroneous or incomplete sensor output to the tag values of the corresponding tag. Accordingly, using the model 165, the industrial controller 160 can derive the tag values of a tag despite receiving erroneous sensor output from the tag reader 150. In an example, the model is built or trained to determine or predict a corrected sensor output from a sensor output from the tag reader, when the sensor output from the tag reader is erroneous or incomplete representation of tag values. Then, based on the predicted sensor output, the controller determines the tag values using techniques well known in the state of the art. In another example, the model 360 is built or trained to predict a corrected sensor output from a sensor output from the tag reader and then predict the tag values of the tag read by the tag reader, when the sensor output from the tag reader is an erroneous or incomplete representation of tag values. These aspects in relation to training of the model 165 are explained below in reference to FIGS. 3 and 4.

Figure 4:
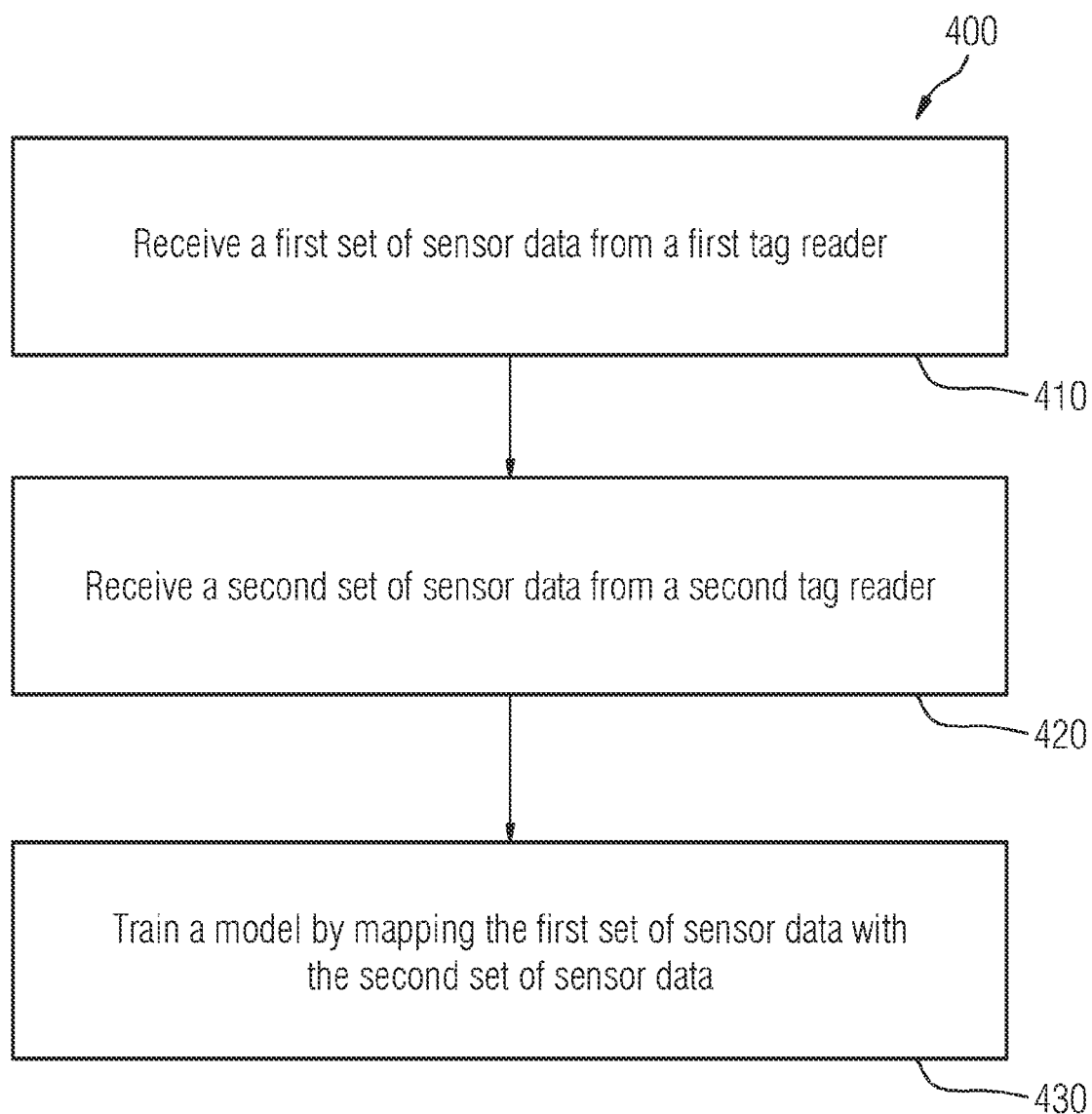
FIG. 4 illustrates another exemplary method for training the model in accordance with the invention.
Figure 5:
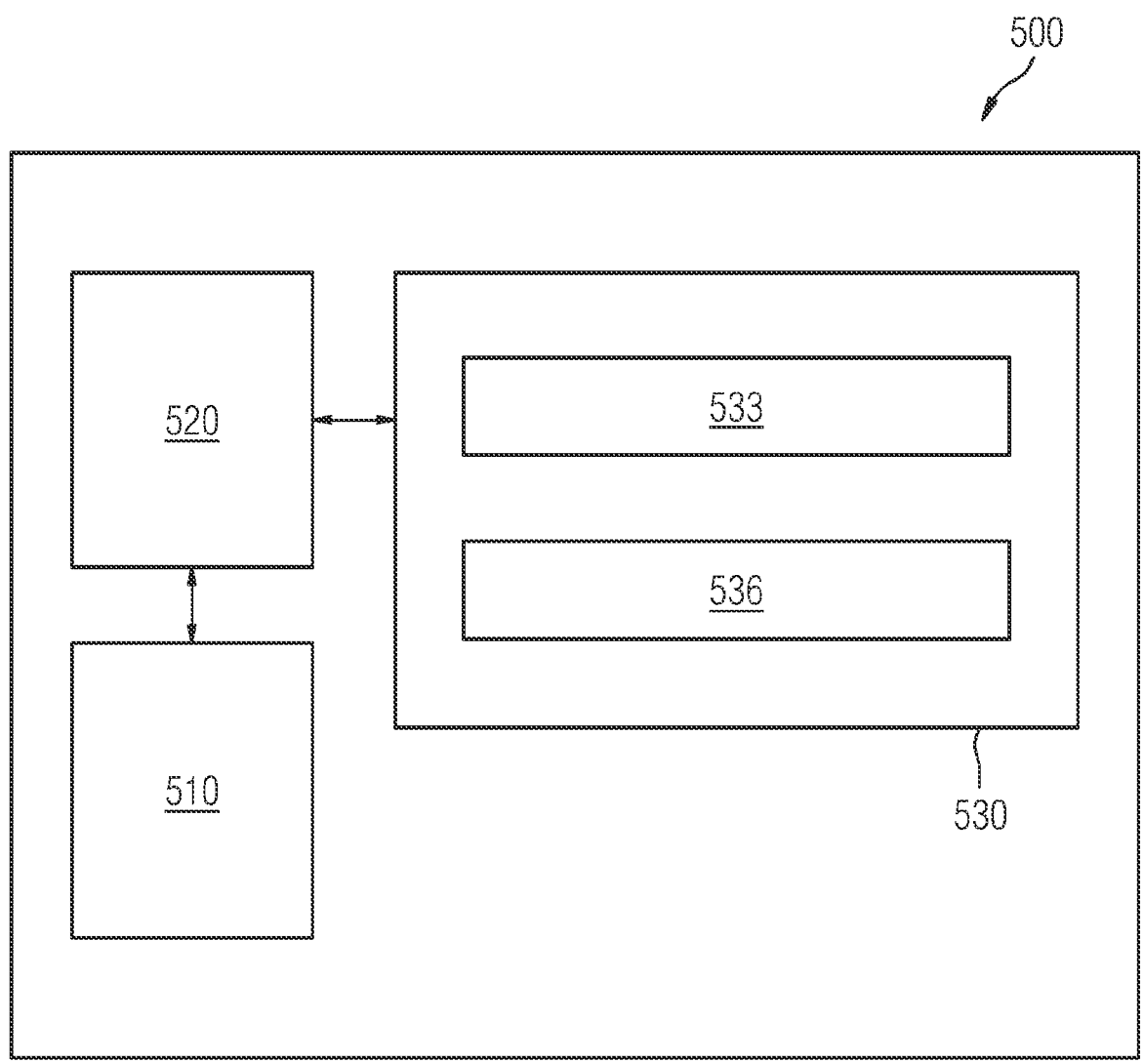
FIG. 5 illustrates an example industrial device for reading the tag located on the object.

FIG. 4 illustrates a method 400 of training the model 360. The model 360 is similar to an untrained version of the model 165. The method 400 is explained using a training system 300 of the industrial automation system in the industrial facility. The training system 300 includes a transportation system 310 for transporting a plurality of objects (shown as exemplary objects 320,330) about the industrial facility. A set of objects are selected for training the model 360 and are moved using the transportation system 310. The tags (325, 335) of objects (also referred to as select objects or training objects) being transported in the transportation system 310 have already been scanned and the tag values have been stored in a tag database 350. In an example, the method 400 is realized by the industrial controller 160.

A first tag reader 340 is mounted or affixed at a third position 341 between first and second positions (365, 370), within a proximity of the transportations system 310. Similarly, a second tag reader 345 is mounted or affixed at a sixth position 346 between third and fourth positions (375, 380), within a proximity of the transportations system 310. Between the first and second positions (365, 370), the objects on the transportation system 310 are moved at a first velocity. At the first velocity, the tag reader 340 can read the tags of the objects with some disturbance and accordingly generates sensor outputs that are either an erroneous or incomplete representation of the tag values of the tags read by the tag reader 340. Between the third and fourth positions, the objects on the transportation system 310 are slowed down from the first velocity to the second velocity, so as to allow the second tag reader 345 to read the tags on the objects on the transportation system without any disturbance. Accordingly, the sensor outputs from the second tag reader 345 generated by reading the tags of the object, are a complete and accurate representation of the tag values of the corresponding tags.

At step 310, the industrial controller 160 receives the first set of sensor data from the tag reader 340. The first set of sensor data includes a plurality of sensor outputs generated by the tag reader 340 by reading a plurality of tags on the plurality of objects (i.e., training objects) being moved or transported on the transportation system 310. The objects are moving at the first velocity relative to the tag reader 340. As a result, there are some disturbances in reading the tags of the objects. Accordingly, each sensor output from the first set of sensor data is at least one of an erroneous and incomplete representation of one or more tag values of a corresponding tag. In an example, tag reader 340 is a camera based tag reader capable of reading one or more barcodes and QR codes. The one or more tags on the one or more tags are barcode tags. Accordingly, when the tag reader 340 reads the tags while the objects are moving with the first velocity, the tag reader 340 experiences blurring due to the first velocity of the object and accordingly generates a sensor output that is an erroneous or incomplete representation of the tag values of the corresponding tag.

Then, at step 320, the industrial controller 160 receives a second set of sensor data from the second tag reader 345. The second set of sensor data comprises a plurality of sensor outputs generated by the second tag reader 345 by reading the plurality of tags of the plurality of objects (i.e., the training objects). The objects are slowed down by the transportation system 120 from the first velocity to the second velocity. As a result, each sensor output from the second set of sensor data is a complete representation of one or more tag values of a corresponding tag.

Then at step 330, the industrial controller 160 trains the model by mapping the first set of sensor data with the second set of sensor data. Each sensor output from the first set of sensor data of a corresponding tag is mapped to a sensor output from the second set of sensor data of the corresponding tag based on a tag identifier of the corresponding tag.

In an example, the model 360 is trained to determine or predict a corrected sensor output from a sensor output from the tag reader, when the sensor output from the tag reader is an erroneous or incomplete representation of tag values. Accordingly, the model 360 is trained to determine a mapping between the first set of sensor data comprising the sensor outputs being erroneous or incomplete representation of tag values and the second set of sensor data comprising the sensor outputs being complete representation of tag values.

In another example, the model 360 is trained to predict a corrected sensor output from a sensor output from the tag reader and then predict the tag values of the tag read by the tag reader, when the sensor output from the tag reader is erroneous or incomplete representation of tag values. Accordingly, the model 360 is trained to determine a mapping amongst the first set of sensor data comprising the sensor outputs being erroneous or incomplete representation of tag values, where the second set of sensor data comprising the sensor outputs forms a complete representation of tag values and the tag values of the corresponding tag.

In an example, the training of the model 360 is performed until a certain accuracy value is reached. Subsequent to reaching the accuracy value, the model is deployed as disclosed in the method 200. In another example, if the accuracy value of the model decreases subsequent to deployment, the model may be re-trained using the method 300.

In another example, the industrial controller 160 is configured to adjust one or more parameters associated with the transportation system 320 (and 120), if the training of the model 360 does not result in the model with the accuracy value equivalent to a predefined accuracy threshold. In the example, where after training, the accuracy of the trained model is less than the predefined accuracy threshold, the velocity of the objects on the transportation system 320 between the first and second position is reduced to a third velocity from the first velocity. The training method is then repeated. The third velocity is determined based on the accuracy value of the model subsequent to the initial training and a predefined de-acceleration value. This is repeated until the accuracy of the trained model is above the predefined accuracy value. Subsequent to the training, during the deployment of the model, the industrial controller 160 controls the transportation system 120 such that the velocity of the object relative to the tag reader is based on the third velocity.

Similarly, in another example, the industrial controller 160 is configured to adjust one or more parameters associated with the transportation system 320 (and 120), if the training of the model 360 results in the model with the accuracy value substantially above to a predefined upper accuracy threshold. In the example, where after training, the accuracy of the trained model is greater than the predefined upper accuracy threshold, the velocity of the objects on the transportation system 320 between the first and second position is increased to a fourth velocity from the first velocity. The training method is then repeated. The fourth velocity is determined based on the accuracy value of model subsequent to the initial training and a predefined acceleration value. This is repeated until the accuracy of the trained model is below the predefined upper accuracy threshold. Subsequent to the training, during the deployment of the model, the industrial controller 160 controls the transportation system 120 such that the velocity of the object relative to the tag reader is based on the fourth velocity.

The present disclosure can take a form of a computer program product comprising program modules accessible from computer-usable or computer-readable mediums storing program code for use by or in connection with one or more computers, processing units, or instruction execution system. For example, the methods 200 and 300 may be realized across one or more devices.

Accordingly, the current disclosure describes an industrial device 500 for determining one or more tag values of a tag located on an object. The industrial device 500 comprises a network interface 510 connected to the tag reader 150 and one or more processors 520 configured to execute a plurality of instructions (533, 536) stored on the memory module 530. Upon execution of the tag value derivation instructions 736, the one or more processors 520 are configured to receive the first sensor output from the first tag reader via the network interface 510 and derive one or more tag values from the first sensor output using the trained model. As described above, the first sensor output is generated by the first tag reader by reading the tag located on the object. The first sensor output is at least one of an erroneous and incomplete representation of the one or more tag values of the tag. As described above, the model is based on a first set of sensor outputs generated by the first tag reader by reading a plurality of tags, and tag values associated with the plurality of tags, and where the first set of sensor outputs comprises a plurality of sensor outputs, and where each sensor output comprises at least one of an erroneous and incomplete representation of one or more tags values of the corresponding tag.

Upon execution of the model training instructions 533, the processors 520 receive the first set of sensor data from the first tag reader, receive the second set of sensor data from the second tag reader, and train the model by mapping the first set of sensor data with the second set of sensor data. As described above, the first set of sensor data comprises a plurality of sensor output generated by the first tag reader by reading a plurality of tags, where each tag of the plurality of tags is located on a corresponding object moving at a first velocity, and where each sensor output from the first set of sensor data is at least one of an erroneous and incomplete representation of one or more tag values of a corresponding tag. Similarly, the second set of sensor data comprises a plurality of sensor output generated by the second tag reader by reading the plurality of tags, where each tag of the plurality of tags is located on a corresponding object moving at a second velocity, and where each sensor output from the second set of sensor data is a complete representation of one or more tag values of a corresponding tag.

For the purpose of this description, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

While the current disclosure is described with references to few industrial devices, a plurality of industrial devices may be utilized in the context of the current disclosure. While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

What is claimed is:

1. A method of reading a tag located on an object, the tag comprising at least one tag value associated with the object, the method comprising:
   a) obtaining a first sensor output, by reading the tag using a tag reader, the first sensor output being at least one of an erroneous and incomplete representation of the at least one tag value of the tag; and
   b) deriving the at least one tag value from the first sensor output utilizing a model;
      wherein the model is based on a first set of sensor outputs generated by the tag reader by reading a plurality of tags and tag values associated with the plurality of tags; and
      wherein the first set of sensor outputs comprises a plurality of sensor outputs, each sensor output of the plurality of sensor outputs from the first set of sensor outputs comprising at least one of an erroneous and incomplete representation of the at least one tag value of a corresponding tag.

2. The method as claimed in claim 1, wherein the object is moving with a first velocity from a first position to a second position; and wherein the tag reader is affixed at a third position between the first and second positions.

3. The method as claimed in claim 1 wherein the model is trained utilizing a training data set comprising a first set of sensor outputs generated by the tag reader by reading a plurality of tags and a second set of sensor outputs from a second tag reader by reading the plurality of tags; and wherein each sensor output from the second set of sensor outputs, is generated by the second tag reader by reading a corresponding tag from the plurality of tags and forms a complete representation of at least one tag value of the corresponding tag.

4. The method as claimed in claim 3, wherein the object is moving with a second velocity from a fourth position to a fifth position, the second tag reader being affixed at a sixth position between the fourth and fifth positions, the second velocity being less than the first velocity.

5. A method of training a model, the method comprising:
   a) receiving a first set of sensor data from a first tag reader, the first set of sensor data comprising a plurality of sensor outputs generated by the first tag reader by reading a plurality of tags, each tag of the plurality of tags being located on a corresponding object moving at a first velocity, and each sensor output from the first set of sensor data being at least one of an erroneous and incomplete representation of at least one tag value of a corresponding tag;
   b) receiving a second set of sensor data from a second tag reader, the second set of sensor data comprising a plurality of sensor output generated by the second tag reader by reading the plurality of tags, each tag of the plurality of tags being located on a corresponding object moving at a second velocity, and each sensor output from the second set of sensor data forming a complete representation of at least one tag value of the corresponding tag; and c) training the model by mapping the first set of sensor data with the second set of sensor data, each sensor output from the first set of sensor data of a corresponding tag being mapped to a sensor output from the second set of sensor data of the corresponding tag based on a tag identifier of the corresponding tag.

6. An industrial device for determining at least one tag value of a tag located on an object, the industrial device comprising:
   a) a network interface connected to a tag reader;
   b) at least one processor connected to a memory module, the at least one processor being configured to:
      i) receive a first sensor output from the tag reader via the network interface, the first sensor output being generated by the tag reader by reading the tag located on the object and the first sensor output being at least one of an erroneous and incomplete representation of the at least one tag value of the tag; and
      ii) derive the at least one tag value from the first sensor output utilizing a model;
      wherein the model is based on a first set of sensor outputs generated by the tag reader by reading a plurality of tags, and tag values associated with the plurality of tags; and
      wherein the first set of sensor outputs comprises of a plurality of sensor outputs, each sensor output from the first set of sensor outputs comprising at least one of an erroneous and incomplete representation of the at least one tag value of the corresponding tag.

7. A training system for training a model for determining at least one tag value of a tag, the training system comprising:
   a) a first tag reader installed between a first and a second position, within a proximity of a transportation system, the first tag reader being configured to generate a first set of sensor outputs by reading a plurality of tags, each tag of the plurality of tags being located on a corresponding object moving at a first velocity on the transportation system, and each sensor output from the first set of sensor outputs from the first set of sensor outputs being at least one of an erroneous and incomplete representation of at least one tag value of a corresponding tag;
   b) a second tag reader installed between a third and a fourth position, within a proximity of the transportation system, the second tag reader being configured to generate a second set of sensor outputs by reading the plurality of tags, each tag of the plurality of tags being located on a corresponding object moving at a second velocity on the transportation system, and each sensor output from the second set of sensor outputs forming a complete representation of at least one tag value of the corresponding tag; and
   c) an industrial device connected to the first and second tag readers, the industrial device being configured to:
      i) receive the first set of sensor outputs from the first tag reader and the second set of sensor outputs from the second tag reader; and
      ii) train the model by mapping the first set of sensor data with the second set of sensor data, each sensor output from the first set of sensor data of a corresponding tag being mapped to a sensor output from the second set of sensor data of the corresponding tag based on a tag identifier of the corresponding tag.

8. A non-transitory computer-readable storage medium encoded with a plurality of program instructions, which when executed by at least one processors, cause the at least one processor to:
   a) obtain a first sensor output, by reading a tag located on an object using a tag reader, the tag comprising at least one tag value associated with the object, and the first sensor output being at least one of an erroneous and incomplete representation of the at least one tag value of the tag; and
   b) derive the at least one tag value from the first sensor output utilizing a model;
      wherein the model is based on a first set of sensor outputs generated by the tag reader by reading a plurality of tags and tag values associated with the plurality of tags, the first set of sensor outputs comprising a plurality of sensor outputs, and each sensor output from the first set of sensor outputs comprising at least one of an erroneous and incomplete representation of at least one tag value of a corresponding tag.

9. A non-transitory computer-readable storage medium for training a model, the non-transitory storage medium being encoded with a plurality of program instructions, which when executed by at least one processor, cause the at least one processor to:
   a) receive a first set of sensor data from a first tag reader, the first set of sensor data comprising a plurality of sensor outputs generated by the first tag reader by reading a plurality of tags, each tag from on the plurality of tags being located on a corresponding object moving at a first velocity, and each sensor output from the first set of sensor data is at least one of an erroneous and incomplete representation of one or more tag values of a corresponding tag;
   b) receive a second set of sensor data from a second tag reader, the second set of sensor data comprising a plurality of sensor output generated by the second tag reader by reading the plurality of tags, each tag of the plurality of tags being located on a corresponding object moving at a second velocity, and each sensor output from the second set of sensor data forming a complete representation of the at least one tag value of the corresponding tag; and
   c) train the model by mapping the first set of sensor data with the second set of sensor data, each sensor output from the first set of sensor data of a corresponding tag being mapped to a sensor output from the second set of sensor data of the corresponding tag based on a tag identifier of the corresponding tag.

* * * * *